US010230236B2

(12) United States Patent
Schumacher et al.

(10) Patent No.: US 10,230,236 B2
(45) Date of Patent: Mar. 12, 2019

(54) METHOD AND SYSTEM FOR FEEDBACK-BASED LOAD CONTROL OF A CLIMATE CONTROL SYSTEM IN TRANSPORT

(71) Applicant: THERMO KING CORPORATION, Minneapolis, MN (US)

(72) Inventors: Ryan Wayne Schumacher, Bloomington, MN (US); Matthew S. Nelson, Cottage Grove, MN (US); Kyle McMonigal, Eden Prairie, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 120 days.

(21) Appl. No.: 15/587,010

(22) Filed: May 4, 2017

(65) Prior Publication Data
US 2018/0320956 A1 Nov. 8, 2018

(51) Int. Cl.
*F25D 29/00* (2006.01)
*H02J 1/00* (2006.01)
*F25D 11/00* (2006.01)
*F25B 49/02* (2006.01)

(52) U.S. Cl.
CPC ............. *H02J 1/00* (2013.01); *F25B 49/02* (2013.01); *F25D 11/003* (2013.01); *F25D 29/003* (2013.01); *F25B 2600/111* (2013.01); *F25B 2600/112* (2013.01); *F25B 2700/15* (2013.01)

(58) Field of Classification Search
CPC ............. F25B 49/02; F25B 2600/111; F25B 2600/112; F25B 2700/15; F25D 11/003
See application file for complete search history.

(56) References Cited

U.S. PATENT DOCUMENTS

| 4,899,549 | A | 2/1990 | Berge et al. |
| 5,303,560 | A | 4/1994 | Hanson et al. |
| 6,318,100 | B1 | 11/2001 | Brendel et al. |
| 6,543,242 | B2 | 4/2003 | Reason et al. |
| 6,550,260 | B1 | 4/2003 | Sullivan |

(Continued)

FOREIGN PATENT DOCUMENTS

WO 02056643 7/2002

OTHER PUBLICATIONS

European Search Report issued in corresponding European Application No. 18170010.5 dated Jun. 15, 2018 (7 pages).

*Primary Examiner* — Daniel Cavallari-See
(74) *Attorney, Agent, or Firm* — Hamre, Schumann, Mueller & Larson, P.C.

(57) ABSTRACT

Methods and systems for feedback-based load control of a climate control system while in transport are provided. The method can include monitoring a current demand from each of a plurality of DC components of the climate control system. The method can also include determining whether the current demand for two or more of the plurality of DC components is in a discontinuous DC format. Also, the method can include, when two or more of the plurality of DC components is in the discontinuous DC format, determining a synchronization pattern for supplying power to the two or more of the plurality of DC components. Further, the method can include a DC power source of the climate control system directing power to the two or more of the plurality of DC components in the discontinuous DC format based on the synchronization pattern.

20 Claims, 4 Drawing Sheets

(56) References Cited

U.S. PATENT DOCUMENTS

| | | | |
|---|---|---|---|
| 6,600,237 B1 * | 7/2003 | Meissner | H02J 1/14 |
| | | | 307/34 |
| 6,622,505 B2 | 9/2003 | Anderson et al. | |
| 7,134,290 B2 | 11/2006 | Awwad et al. | |
| 7,937,962 B2 | 5/2011 | Dudley et al. | |
| 8,789,381 B2 | 7/2014 | Awwad et al. | |
| 2011/0144807 A1 | 6/2011 | Buda et al. | |
| 2012/0137713 A1 | 6/2012 | Duraisamy et al. | |
| 2012/0187762 A1 | 7/2012 | Kim | |
| 2013/0247598 A1 | 9/2013 | Fulmer et al. | |
| 2013/0298575 A1 | 11/2013 | Stark et al. | |
| 2014/0026599 A1 | 1/2014 | Rusignuolo et al. | |
| 2014/0150482 A1 | 6/2014 | Ueno et al. | |

* cited by examiner

METHOD AND SYSTEM FOR FEEDBACK-BASED LOAD CONTROL OF A CLIMATE CONTROL SYSTEM IN TRANSPORT

FIELD

The embodiments described herein are directed to climate control systems in transport. More particularly, the embodiments described herein relate to methods and systems for feedback-based load control of the climate control system while in transport.

BACKGROUND

A transport refrigeration system (TRS) is generally used to control an environmental condition (e.g., temperature, humidity, air quality, and the like) within a transport unit (e.g., a container (such as a container on a flat car, an intermodal container, etc.), a truck, a box car, or other similar transport unit). In some embodiments, the transport unit can include a plurality of zones and the TRS can be a multi-zone TRS (MTRS) that is configured to provide independent climate control to each of the plurality of zones within the transport unit.

SUMMARY

The embodiments described herein are directed to a climate control system. More particularly, the embodiments described herein relate to methods and systems for feedback-based load control of the climate control system while in transport.

In particular, the embodiments described herein can coordinate and balance power requirements for multiple asynchronous parallel loads in a climate control system. That is, the embodiments described herein can synchronize the asynchronous parallel loads by implementing phase angle control of the asynchronous parallel loads. Accordingly, unstable ripple current demands from two or more of the asynchronous parallel loads of the climate control system can be eliminated in order to stabilize the overall power system of the climate control system and/or increase battery charging efficiency.

In one embodiment, a feedback-based load control method for a climate control system in transport is provided. The method includes monitoring a current demand from each of a plurality of Direct Current (DC) components of the climate control system. The method also includes determining whether the current demand for two or more of the plurality of DC components is in a discontinuous DC format. Also, the method includes, when two or more of the plurality of DC components is in the discontinuous DC format, determining a synchronization pattern for supplying power to the two or more of the plurality of DC components. Further, the method includes a DC power source of the climate control system directing power to the two or more of the plurality of DC components in the discontinuous DC format based on the synchronization pattern.

In another embodiment, a feedback-based load control system for a climate control system in transport is provided. The feedback-based load control system includes a plurality of DC components for operating the climate control system, a DC power source supplying power to the plurality of DC components, and a controller. The controller monitors a current demand from each of the plurality of DC components, determines whether the current demand for the two or more of the plurality of DC components is in a discontinuous DC format, and, when two or more of the plurality of DC components is in the discontinuous DC format determines a synchronization pattern for supplying power to the two or more of the plurality of DC components, and instructs the DC power source to supply power to the two or more of the plurality of DC components based on the synchronization pattern. The DC power source directs power to the two or more of the plurality of DC components in the discontinuous DC format based on the synchronization pattern.

In yet another embodiment, a refrigerated transport unit is provided. The refrigerated transport unit includes a transport unit and a transport refrigeration system for providing climate control within the transport unit. The transport refrigeration system includes a compressor, a condenser, an evaporator, a plurality of DC components for operating the transport refrigeration system, and a feedback-based load control system. The feedback-based load control system includes a controller and a DC power source supplying power to the plurality of DC components. The controller monitors a current demand from each of the plurality of DC components, determines whether the current demand for the two or more of the plurality of DC components is in a discontinuous DC format, and when two or more of the plurality of DC components is in the discontinuous DC format determines a synchronization pattern for supplying power to the two or more of the plurality of DC components, instructs the DC power source to supply power to the two or more of the plurality of DC components based on the synchronization pattern. The DC power source directs power to the two or more of the plurality of DC components in the discontinuous DC format based on the synchronization pattern.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

The embodiments described herein are directed to a climate control system. More particularly, the embodiments described herein relate to methods and systems for feedback-based load control of the climate control system while in transport.

In particular, the embodiments described herein can coordinate and balance power requirements for multiple asynchronous parallel loads in a climate control system. That is, the embodiments described herein can synchronize the asynchronous parallel loads by implementing phase angle control of the asynchronous parallel loads. Accordingly, unstable ripple current demands from the asynchronous parallel loads of the climate control system can be eliminated in order to stabilize the overall power system of the climate control system and/or increase battery charging efficiency.

The embodiments described herein can be provided in any climate control system including a TRS or MTRS for a TU, a heating, ventilation and air conditioning (HVAC) system for a bus, etc.

DC power in a discontinuous DC format, as used herein, refers to DC power that retains a constant polarity but can vary in voltage and/or current over time. In some embodiments, DC current in a discontinuous DC format can be periodic. For example, the DC power in the discontinuous DC format may have a periodic square shaped waveform, a periodic triangular shaped waveform, etc. that does not reverse in polarity. In some embodiments, DC current in a discontinuous DC format can be variable.

Figure 1:
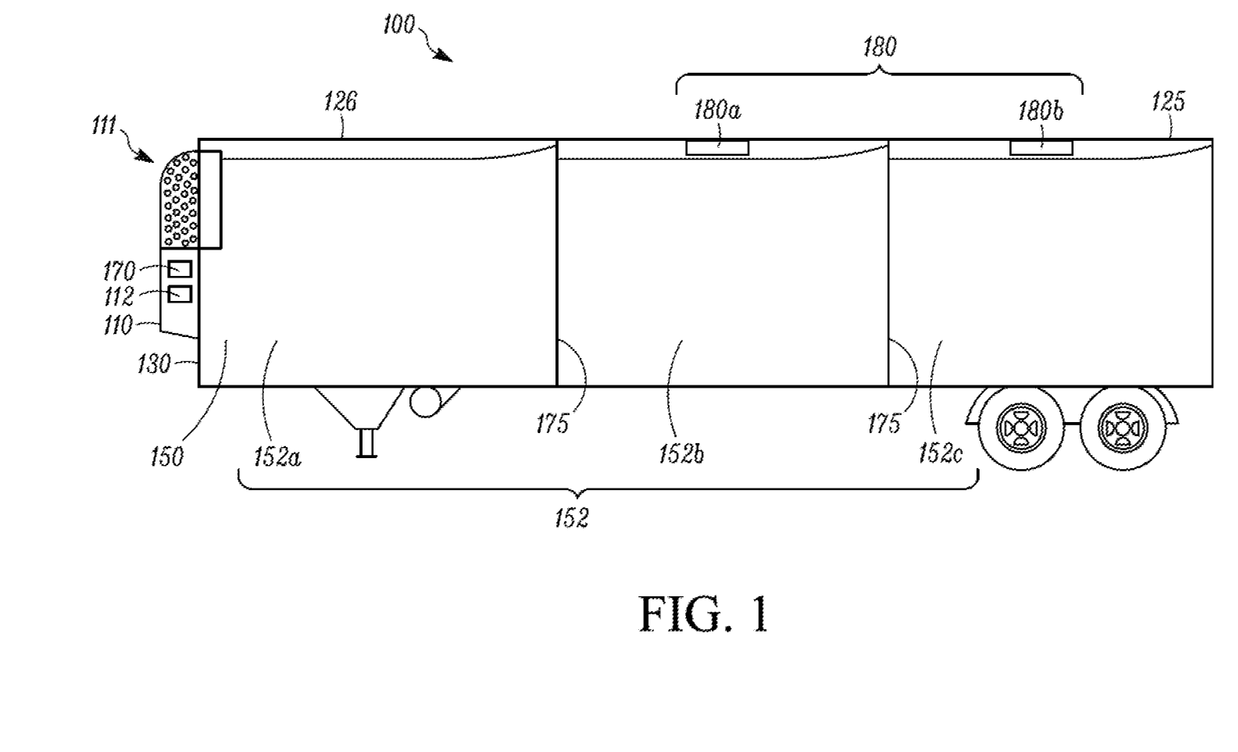
FIG. 1 illustrates a schematic cross sectional side view of a refrigerated transport unit with a multi-temp transport refrigeration system.

FIG. 1 illustrates one embodiment of a MTRS 100 for a transport unit (TU) 125 that can be towed, for example, by a tractor (not shown). The MTRS 100 includes a transport refrigeration unit (TRU) 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) (not shown) that are configured to measure one or more parameters of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

The TU 125 shown in FIG. 1 is a trailer unit. However, it will be appreciated that the embodiments described herein are not limited to trucks and trailer units, but can apply to any other type of transport unit including, but not limited to, a container (such as a container on a flat car, an intermodal container, etc.), a truck, a box car, or other similar transport unit.

The programmable MTRS Controller 170 may comprise a single integrated control unit or may comprise a distributed network of IRS control elements. The number of distributed control elements in a given network can depend upon the particular application of the principles described herein. The MTRS controller 170 is configured to control operation of the MTRS 100.

As shown in FIG. 1, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include a prime mover, a battery, an alternator, a generator, a solar panel, a fuel cell, etc. Also, the prime mover can be a combustion engine such as a two speed engine, a variable speed engine, etc. The power module 112 can provide power to, for example, the MTRS Controller 170, a compressor (not shown), a plurality of DC components (see FIG. 2), a battery charger (see FIG. 2), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (see FIG. 2) for providing DC electrical power to the plurality of DC components (see FIG. 2), a battery charger (see FIG. 2), etc. The DC power source can receive mechanical and/or electrical power from, for example, a shore power source (e.g., Utility power, etc.), a prime mover (e.g., a diesel engine, etc.) coupled with a generator machine (e.g., a belt-driven alternator), etc. For example, in some embodiments, mechanical energy generated by a diesel engine is converted into electrical energy via a generator machine. The electrical energy generated via the belt driven alternator is then converted into DC electrical power via a Battery Charger converter. Details of the DC power source are discussed below with respect to FIG. 2.

The internal space 150 is divided into a plurality of zones 152. The term "zone" means a part of an area of the internal space 150 separated by walls 175. In some examples, each of the zones 152 can maintain a set of environmental condition parameters (e.g. temperature, humidity, air quality, etc.) that is independent from other zones 152.

Note that in FIG. 1 the internal space 150 is divided into three zones: a first zone 152a; a second zone 152b; and a third zone 152c. Each of the zones 152 shown in FIG. 1 is divided into substantially equal areas. However, it is to be realized that the internal space 150 may be divided into any number of zones in any size configuration that is suitable for environmental control of the different zones.

The MTRS 100 is configured to control and maintain separate environmental condition requirements in each of the zones 152. The MTRS 100 includes a refrigeration circuit (not shown) that fluidly connects a compressor (not shown), a condenser (not shown), a host unit 111, and a plurality of remote units 180. The TRU 110 includes the compressor, the condenser, and the host unit 111. The plurality of remote units 180 is disposed in the 125. The refrigeration circuit provides independent climate control for each of the first, second and third zones 152a-c. The host unit 111 provides climate control for the first zone 152a. The first remote unit 180a is disposed in the second zone 152b and provides climate control for the second zone 152b. The second remote unit 180b is disposed in the third zone 152c and provides climate control for the third zone 152c. The host unit 111 and the remote units 180 are collectively referred to herein as heat exchange units. It will be appreciated that in other embodiments the number of heat exchange units can vary based on the number of zones in the transport unit. For example, in a two zone TU, the MTRS can include a host unit for providing climate control to the first zone and a remote unit for providing climate control to the second zone.

In one embodiment, the first zone 152a can be a frozen temperature zone operating to maintain a temperature set point within a frozen temperature range and the second and third zones 152b, 152c can be fresh temperature zones operating to maintain a temperature set point within a fresh temperature range. In one embodiment, for example, the frozen temperature range can be between about −25° F. to about 15° F. and the fresh temperature range can be between about 16° F. to about 90° F. In another embodiment, for example, the frozen temperature range can be between about −25° F. to about 24° F. and the fresh temperature range can be between about 26° F. to about 90° F. It will be appreciated that in other embodiments, any of the first, second and third zones 152a-c can be a fresh temperature zone operating to maintain a temperature set point within a fresh temperature range or a frozen temperature zone operating to maintain a temperature set point within a frozen temperature range.

Each heat exchanger unit 111, 180a, 180b is fluidly connected to the compressor and the condenser. The host unit 111 and each remote unit 180a, 180b may include one or more heat exchangers (e.g., evaporator(s)), one or more blower(s) or fan(s) for providing climate control within the particular zone the heat exchanger unit is located, one or more flow regulating devices (e.g., solenoid valve(s), etc.) for controlling the amount of refrigerant flow into the heat exchanger unit, and one or more throttling devices electronic throttling valve(s), etc.) for controlling the amount of refrigerant flow available to a suction end of the compressor of the MTRS 100. The heat exchange units (e.g., the host unit 111 and each of the remote units 180) can operate in a plurality of operational modes (e.g., a NULL mode, a running NULL mode, a COOL mode, a HEAT mode, a DEFROST mode, a low fan speed mode, a high fan speed mode, a high prime mover speed mode, a low prime mover speed mode, etc.).

Figure 2:
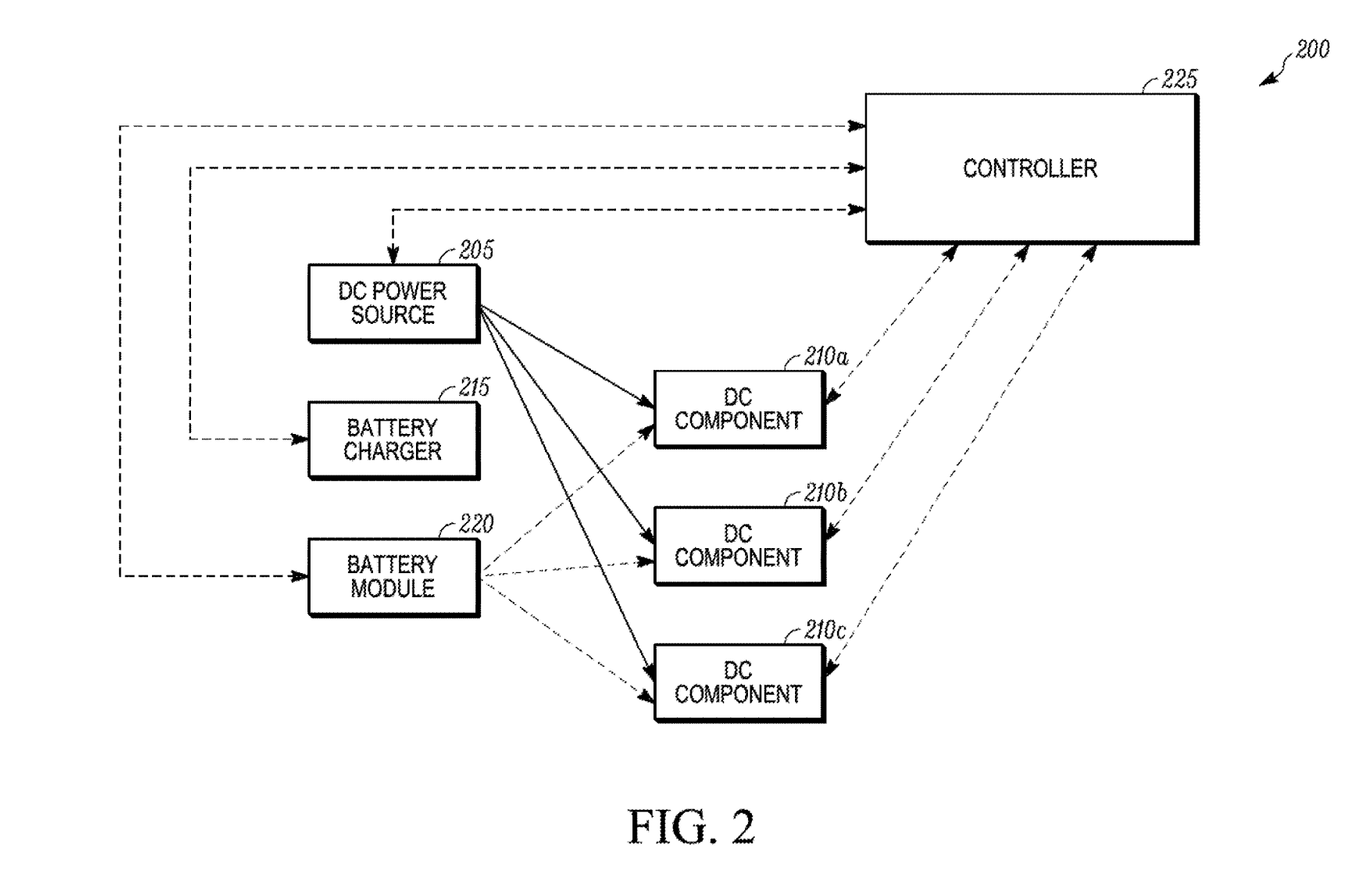
FIG. 2 illustrates a block diagram schematic of one embodiment for a feedback-based load control system 200 for a climate control system, according to one embodiment.

FIG. 2 illustrates a block diagram schematic of one embodiment for a feedback-based load control system 200 for a climate control system (including the MTRS 100 shown in FIG. 1). The system includes a DC power source 205 that provides power to a plurality of DC components 210a-c and optionally to a battery charger 215. The system 200 also includes a controller 225 that can monitor, communicate and control each of the DC power source 205, the battery charger 215, the battery module 220, and the plurality of DC components 210a-c.

The battery charger 215 can thereby charge a battery module 220. The battery module 220 can provide power, for example, to the controller 225, a compressor (not shown), etc. when the DC power source 205 is unavailable (e.g., off, overloaded, incapable, etc.). When the climate control system is a TRS or MTRS and the TRU is run by a prime mover, the battery module 220 can provide power to start the prime mover. When required, the battery module 220 can provide power to the plurality of DC components 210a-c as well. For example, when the DC power source 205 is not able to provide sufficient power to the plurality of DC components 210a-c, the battery module 220 can provide power alone or in combination with the DC power source 205 to the plurality of DC components 210a-c.

The DC power source 205 can include, for example, a generator (e.g., a three phase generator), an alternator (e.g., belt-driven alternator), a rectifier, an electric drive motor, etc. For example, a shore power source can provide AC electric power to a three phase generator of the DC power source 205, which in turn can direct DC electrical power to the battery charger 215 and the plurality of DC components 210a-c. In another example, a prime mover can provide mechanical power to a belt-driven alternator of the DC power source 205, which in turn can direct DC electrical power to the battery charger 215 and the plurality of DC components 210a-c. In yet another example, a three phase active electrical source can provide AC electrical power to a rectifier of the DC power source 205, which in turn can direct DC electrical power to the plurality of DC components 210a-c and optionally the battery charger 215. It will be appreciated that based on the requirements of the MTRS, the DC power source 205 can: direct DC electrical power to the plurality of DC components 210a-c without providing power to the battery charger 215; direct DC electrical power to the plurality of DC components 210a-c and to the battery charger 215 at the same time; or direct DC electrical power to the battery charger 215 without providing power to the plurality of DC components 210a-c.

The controller 225 is configured to implement feedback based load control for the TRS. In particular, the controller 225 can synchronize power output to each of the plurality of DC components to stabilize the DC power source 205 and increase charging efficiency of the battery charger 215. Details regarding feedback-based load control are discussed below with respect to FIG. 3.

As shown in FIG. 2, the plurality of DC components 210a-c acts as asynchronous power loads to the DC power source 205. Examples of the DC components 210a-c can include, for example, DC fan motor(s) for a condenser fan or an evaporator blower, a fuel pump, a drain tube heater, etc. In some embodiments, two or more of the DC components 210a-c can demand current in a discontinuous DC format. Current demand in a discontinuous DC format can be a ripple current waveform, whereby each of the two or more DC components 210a-c draw current from the DC power source 205 such that the current draw follows a periodic waveform in a time domain. Without coordination of power directed to the multiple DC components 210a-c demanding current in the discontinuous DC format, the DC power source 205 can receive surges in power demand and may not be able to support these surges when current demand from two or more of the DC components 210a-c are about simultaneously at a peak along the periodic waveform at the same time. This can result in, for example, a shortage of the DC power source 205, current to fold back into the DC power source 205, operation of the DC power source 205 beyond safety boundary conditions, etc. This can also result in the DC power source 205 providing less power to the battery charger to charge the battery module 220 and cause the battery module 220 to help power all of the DC components 210a-c, thereby depleting the charge of the battery module 220.

In one embodiment, the feedback-based load control system 200 can be used for a MTRS (e.g., the MTRS 100 shown in FIG. 1) that includes a host unit (e.g., the host unit 111 shown in FIG. 1) and a plurality of remote units (e.g., the remote units 180 shown in FIG. 1). Each of the host unit and the plurality of remote units can include multiple fan motors (e.g., the DC components 210a-c) driven in parallel per unit. The feedback-based load control system 200 as discussed below with respect to FIG. 3 can regulate a total power demand of these DC components 210a-c by coordinating and balancing power requirements for each of the fan motors. This can prevent unstable ripple current demands and stabilize overall power operation of the DC power source 205 and charging efficiency of the battery charger 215.

Figure 3:
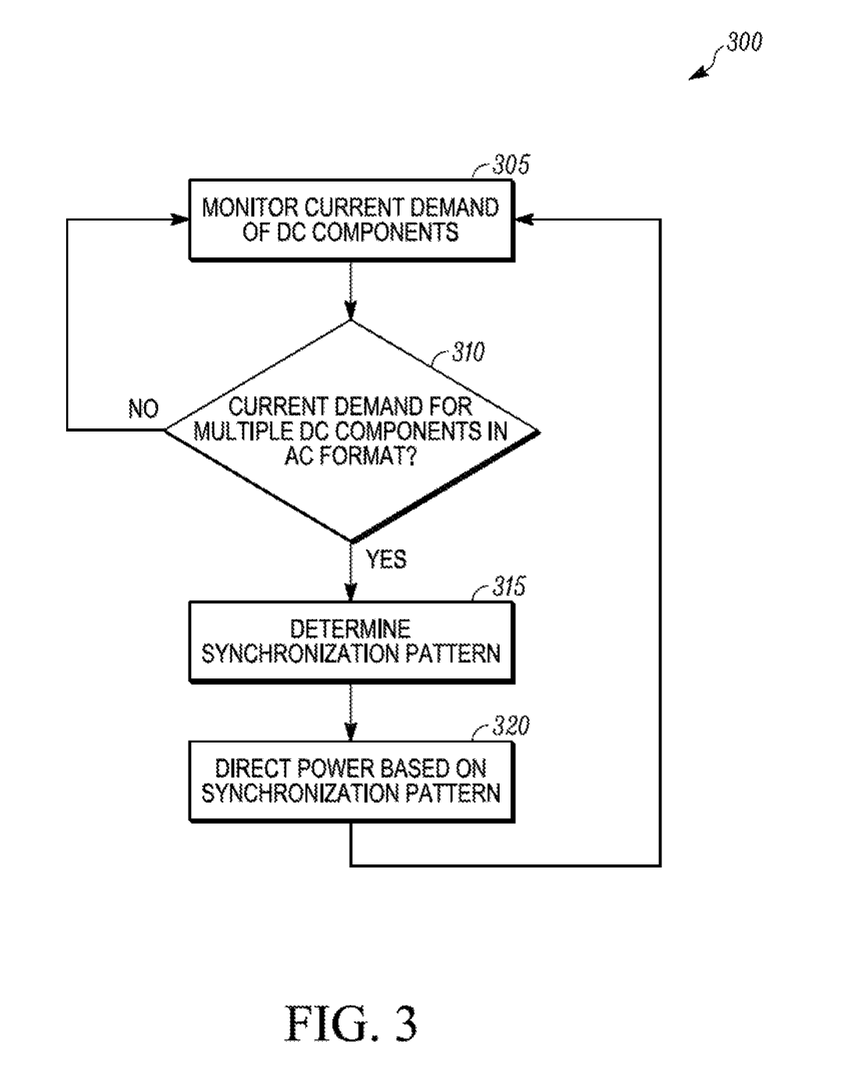
FIG. 3 illustrates one embodiment of a method for implementing feedback-based load control for a climate control system using the feedback-based load control system shown in FIG. 2.

FIG. 3 illustrates one embodiment of a method 300 for implementing feedback-based load control for a climate control system using the feedback-based load control system 200 shown in FIG. 2. The method 300 begins at 305 where the controller 225 monitors the current demanded from each of the DC components 210a-c. In some embodiments, the controller 225 can monitor the current demanded from each of the DC components 210a-c based on an integrated drive circuit of the power source 205 that senses current demand from each of the DC components 210a-c. In other embodiments, the controller 225 can monitor the current demanded from each of the DC components 210a-c based on a plurality of sensors (not shown) that can sense the current demand from each of the DC components 210a-c. In yet some other embodiments, when the DC components 210a-c are fan motors, the controller 225 can monitor the current demanded from each of the DC components 210a-c based on an external digital input corresponding to motor switching of the DC components 210a-c.

At 310, the controller 225 determines whether two or more of the DC components 210a-c are demanding current in a discontinuous DC format. For example, the current demand in a discontinuous DC format can be a ripple current waveform. If the controller 225 determines that two or more of the DC components 210a-c are demanding current in a discontinuous DC format, the method 300 proceeds to 315. If the controller 225 determines that two or more of the DC components 210a-c are not demanding current in a discontinuous DC format, the method 300 returns to 305.

At 315, the controller 225 determines a synchronization pattern for supplying power from the DC power source 205 to each of the DC components 210a-c. The synchronization pattern for supplying power from the DC power source 205 to each of the DC components 210a-c can reduce and/or zero out peaks in current demand (e.g., the ripple current) from the two or more of the DC components 210a-c demanding current in a discontinuous DC format by phasing the current demand such that peaks in the current demand occur at different times. For example, in one embodiment, if the controller 225 at 310 determines that two of the DC components 210a-c are demanding current in a discontinuous DC format, the controller 225 can synchronize the two DC components demanding current in the discontinuous DC format to phase (in the time domain) the peak of the current demand (e.g., ripple current) for each of the two DC components at 180°. In another example, if the controller 225 at 210 determines that three of the DC components 210a-c are demanding current in the discontinuous DC format to phase the peak of the current demand (e.g., ripple current) for each of the three DC components at 120g. The method 300 then proceeds to 320.

At 320, the controller 225 instructs the DC power source 205 to direct power to each of the DC components 210a-c based on the synchronization pattern determined at 315. Accordingly, the method 300 can synchronize the DC components 210a-c by implementing phase angle control to the DC components 210a-c. That is, operating the DC components 210a-c according to the synchronization pattern can phase cancel the current demand from the DC components 210a-c. For example, in one embodiment, the controller 225 can instruct the DC power source 205 to supply power first to one of the DC components 210a-c demanding current in the discontinuous DC format, then waits to supply power to a second one of the DC components 210a-c demanding current in the discontinuous DC format, and so on according to the synchronization pattern such that peaks in the current demands from each of these DC components 210a-c are phased apart from each other.

Accordingly, detrimental effects of unstable current demands (e.g., ripple current demands) from two or more of the DC components 210a-c of can be reduced and/or eliminated in order to stabilize the system 200 of the climate control system. That is, surges in power demand can be phased apart from each other which can prevent a shortage of the DC power source 205, prevent current from folding back into the DC power source 205, prevent operation of the DC power source 205 beyond safety boundary conditions, etc. This can also allow the DC power source 205 to maintain a sufficient supply of power to the battery charger 215 so that the battery module 220 can be efficiently charged. This can also prevent the need of the battery module 220 front being required to supplement the DC power source 205 in providing power to the DC components 210a-c due to unstable current demands, thereby preventing unnecessary charge depletion of the battery module 220.

Figure 4:
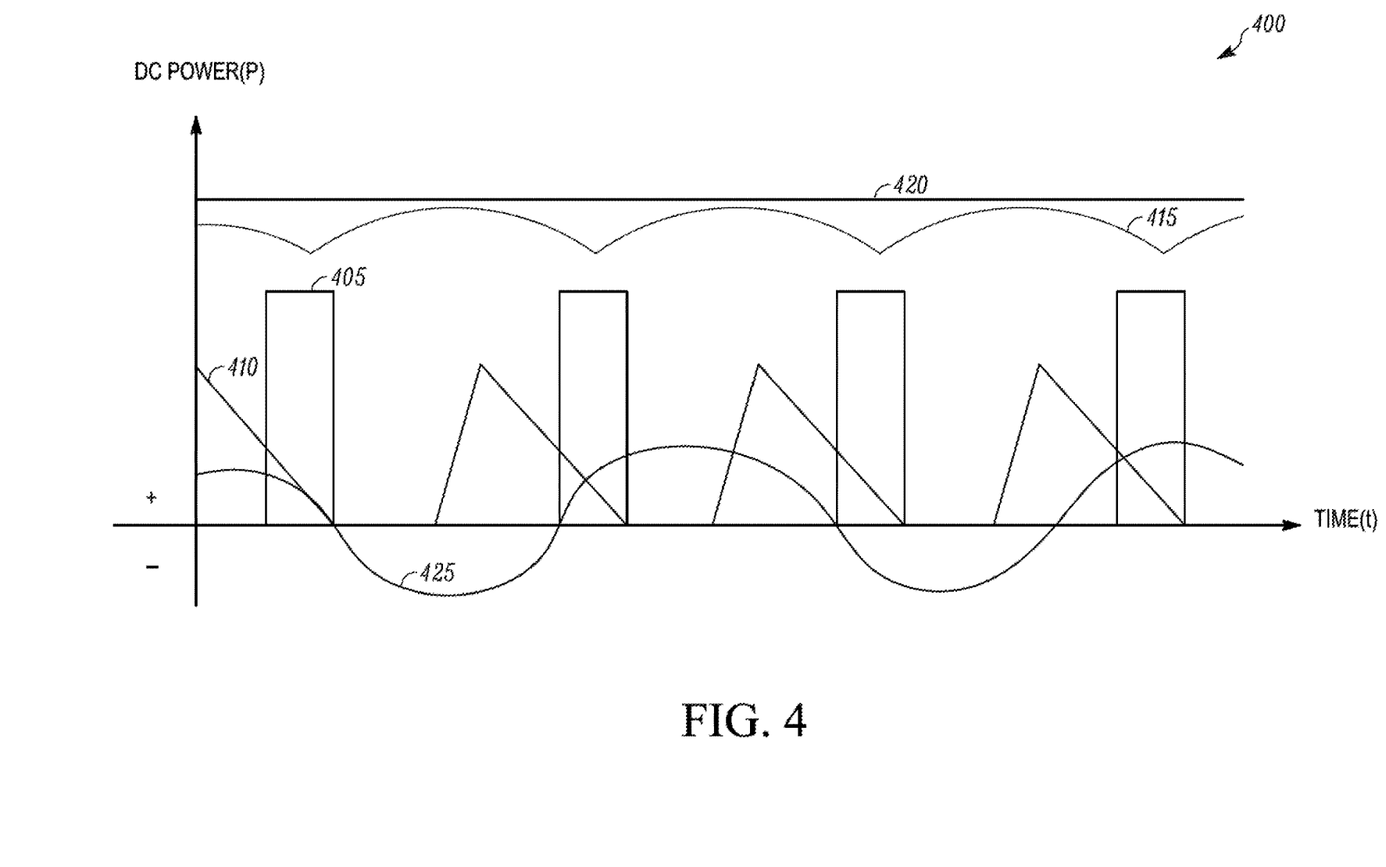
FIG. 4 illustrates different examples of DC power in a discontinuous DC format.

FIG. 4 illustrates different examples of DC power in a discontinuous DC format. In particular, FIG. 4 illustrates a graph 400 with DC power (P) along the y-axis and time (t) along the x-axis. The graph 400 includes multiple power waveforms including a square shaped DC power waveform 405 in a discontinuous DC format, a triangular shaped DC power waveform 410 in a discontinuous DC format, a pulsating DC power waveform 415 in a continuous DC format, a DC power waveform 420 in a continuous DC format, and an AC power waveform 425. As shown in FIG. 4, waveforms 405, 410 and 415 remain in the positive polarity but have a varying voltage and/or current leading to a discontinuous DC format. Also, while waveforms 405, 410 and 415 have a periodic waveform, it will be appreciated that in other embodiments a DC waveform in a discontinuous DC format may have a non-periodic waveform. In contrast, the DC power waveform 420 shows that the voltage and/or current remains constant over time and is therefore in a continuous DC format. Also, waveforms 405, 410, 415 and 420 are all DC waveforms as the DC power does not change polarity. While waveforms 405, 410, 415 and 420 are all shown in the positive polarity, it will be appreciated that in some embodiments a DC waveform can be in the negative polarity instead of the positive polarity.

The AC waveform 425 alternates between the positive polarity and the negative polarity over time. While the AC waveform 425 takes a sinusoidal shape, it will be appreciated that in other embodiments an AC waveform can take on other shapes including a square shape, a triangular shape, etc.

Aspects:

It is appreciated that any of aspects 1-6, 7-14 and 15-20 can be combined.

Aspect 1. A feedback-based load control method for a climate control system in transport, the method comprising:

monitoring a current demand from each of a plurality of DC components of the climate control system;

determining whether the current demand for two or more of the plurality of DC components is in a discontinuous DC format;

when two or more of the plurality of DC components is in the discontinuous DC format, determining a synchronization pattern for supplying power to the two or more of the plurality of DC components;

a DC power source of the climate control system directing power to the two or more of the plurality of DC components in the discontinuous DC format based on the synchronization pattern.

Aspect 2. The method of aspect 1, wherein determining whether the current demand for two or more of the plurality of DC components are in the discontinuous DC format includes determining for each of the plurality of DC components whether the current demand has a ripple current waveform.

Aspect 3. The method of either one of aspects 1 and 2, wherein the synchronization pattern is a pattern for phasing the current demand such that a peak in the current demand for a first DC component of the two or more of the plurality of DC components in the discontinuous DC format occur at a different time than a peak in the current demand for a second DC component of the two or more of the plurality of DC components in the discontinuous DC format.

Aspect 4. The method of any one of aspects 1-3, wherein directing power to the two or more of the plurality of DC components in the discontinuous DC format based on the synchronization pattern includes phase canceling the current demand from the two or more DC components in the discontinuous DC format.

Aspect 5. The method of any one of aspects 1-4, wherein when two DC components are in the discontinuous DC format, the synchronization pattern phases a peak of the current demand of a first DC component in the discontinuous DC format 180° from a peak of the current demand of a second DC component in the discontinuous DC format.

Aspect 6. The method of any one of aspects 1-4, wherein when three DC components are in the discontinuous DC format, the synchronization pattern phases a peak of the current demand of a first DC component in the discontinuous DC format 120° from a peak of the current demand of a second DC component in the discontinuous DC format, and phases the peak of the current demand of the second DC component 120° from a peak of the current demand of a third DC component in the discontinuous DC format.

Aspect 7. A feedback-based load control system for a climate control system in transport, the feedback-based load control system comprising:
a plurality of DC components for operating the climate control system;
a DC power source supplying power to the plurality of DC components; and
a controller that:
monitors a current demand from each of the plurality of DC components,
determines whether the current demand for the two or more of the plurality of DC components is in a discontinuous DC format and
when two or more of the plurality of DC components is in the discontinuous DC format determines a synchronization pattern for supplying power to the two or more of the plurality of DC components, instructs the DC power source to supply power to the two or more of the plurality of DC components based on the synchronization pattern,
wherein the DC power source directs power to the two or more of the plurality of DC components in the discontinuous DC format based on the synchronization pattern.

Aspect 8. The feedback-based load control system of aspect 7, wherein each of the plurality of DC components is at least one of a condenser fan, an evaporator blower, a fuel pump, and a drain tube heater.

Aspect 9. The feedback-based load control system of either one of aspects 7 and 8, wherein the controller determines whether the current demand for two or more of the plurality of DC components are in the discontinuous DC format by determining for each of the plurality of DC components whether the current demand has a ripple current waveform.

Aspect 10. The feedback-based load control system of any one of aspects 7-9, wherein the synchronization pattern is a pattern for phasing the current demand such that a peak in the current demand for a first DC component of the two or more of the plurality of DC components in the discontinuous DC format occur at a different time than a peak in the current demand for a second DC component of the two or more of the plurality of DC components in the discontinuous DC format.

Aspect 11. The feedback-based load control system of any one of aspects 7-10, wherein the DC power source directs power to the two or more of the plurality of DC components in the discontinuous DC format based on the synchronization pattern to phase cancel the current demand from the two or more DC components in the discontinuous DC format.

Aspect 12. The feedback-based load control system of any one of aspects 7-11, wherein when the controller determines that two DC components of the plurality of DC components are in the discontinuous DC format, the synchronization pattern phases a peak of the current demand of a first DC component in the discontinuous DC format 180° from a peak of the current demand of a second DC component in the discontinuous DC format.

Aspect 13. The feedback-based load control system of any one of aspects 7-11, wherein when the controller determines that three DC components of the plurality of DC components are in the discontinuous DC format, the synchronization pattern phases a peak of the current demand of a first DC component in the discontinuous DC format 120° from a peak of the current demand of a second DC component in the discontinuous DC format, and phases the peak of the current demand of the second DC component 120° from a peak of the current demand of a third DC component in the discontinuous DC format.

Aspect 14. The feedback-based load control system of any one of aspects 7-13, further comprising:
a battery module that supplies power to the plurality of DC components when the DC power source is unavailable; and
a battery charger that charges the battery module, wherein the DC power source supplies power to the battery charger.

Aspect 15. A refrigerated transport unit comprising:
a transport unit, and
a transport refrigeration system for providing climate control within the transport unit, the transport refrigeration system including a compressor, a condenser, an evaporator, a plurality of DC components for operating the transport refrigeration system, and a feedback-based load control system,
wherein the feedback-based load control system includes:
a DC power source supplying power to the plurality of DC components,
a controller that:
monitors a current demand from each of the plurality of DC components,
determines whether the current demand for the two or more of the plurality of DC components is in a discontinuous DC format, and
when two or more of the plurality of DC components is in the discontinuous DC format determines a synchronization pattern for supplying power to the two or more of the plurality of DC components, instructs the DC power source to supply power to the two or more of the plurality of DC components based on the synchronization pattern,
wherein the DC power source directs power to the two or more of the plurality of DC components in the discontinuous DC format based on the synchronization pattern.

Aspect 16. The refrigerated transport unit of aspect 15, wherein each of the plurality of DC components is at least one of a condenser fan, an evaporator blower, a fuel pump, and a drain tube heater.

Aspect 17. The refrigerated transport unit of either one of aspects 15 and 16, wherein the controller determines whether the current demand for two or more of the plurality of DC components are in the discontinuous DC format by determining for each of the plurality of DC components whether the current demand has a ripple current waveform.

Aspect 18. The refrigerated transport unit of any one of aspects 15-17, wherein the synchronization pattern is a pattern for phasing the current demand such that a peak in the current demand for a first DC component of the two or more of the plurality of DC components in the discontinuous DC format occur at a different time than a peak in the current demand for a second DC component of the two or more of the plurality of DC components in the discontinuous DC format.

Aspect 19. The refrigerated transport unit of any one of aspects 15-18, wherein the DC power source directs power to the two or more of the plurality of DC components in the discontinuous DC format based on the synchronization pattern to phase cancel the current demand from the two or more DC components in the discontinuous DC format.

Aspect 20. The refrigerated transport unit of any one of aspects 15-19, further comprising:
a battery module that supplies power to the plurality of DC components when the DC power source is unavailable; and
a battery charger that charges the battery module, wherein the DC power source supplies power to the battery charger.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A feedback-based load control method for a climate control system transport, the method comprising:
monitoring a current demand from each of a plurality of DC components of the climate control system;
determining whether the current demand for two or more of the plurality of DC components is in a discontinuous DC format;
when two or more of the plurality of DC components is in the discontinuous DC format, determining a synchronization pattern for supplying power to the two or more of the plurality of DC components;
a DC power source of the climate control system directing power to the two or more of the plurality of DC components in the discontinuous DC format based on the synchronization pattern.

2. The method of claim 1, wherein determining whether the current demand for two or more of the plurality of DC components are in the discontinuous DC format includes determining for each of the plurality of DC components whether the current demand has a ripple current waveform.

3. The method of claim 1, wherein the synchronization pattern is a pattern for phasing the current demand such that a peak in the current demand for a first DC component of the two or more of the plurality of DC components in the discontinuous DC format occur at a different time than a peak in the current demand for a second DC component of the two or more of the plurality of DC components in the discontinuous DC format.

4. The method of claim 1, wherein directing power to the two or more of the plurality of DC components in the discontinuous DC format based on the synchronization pattern includes phase canceling the current demand from the two or more DC components in the discontinuous DC format.

5. The method of claim 1, wherein when two DC components are in the discontinuous DC format, the synchronization pattern phases a peak of the current demand of a first DC component in the discontinuous DC format 180° from a peak of the current demand of a second DC component in the discontinuous DC format.

6. The method of claim 1, wherein When three DC components are in the discontinuous DC format, the synchronization pattern phases a peak of the current demand of a first DC component in the discontinuous DC format 120° from a peak of the current demand of a second DC component in the discontinuous DC format, and phases the peak of the current demand of the second DC component 120° from a peak of the current demand of a third DC component in the discontinuous DC format.

7. A feedback-based load control system for a climate control system in transport, the feedback-based load control system comprising:
a plurality of DC components for operating the climate control system;
a DC power source supplying power to the plurality of DC components; and
a controller that:
monitors a current demand from each of the plurality of DC components,
determines whether the current demand for the two or more of the plurality of DC components is in a discontinuous DC format, and
when two or more of the plurality of DC components is in the discontinuous DC format determines a synchronization pattern for supplying power to the two or more of the plurality of DC components,
instructs the DC power source to supply power to the two or more of the plurality of DC components based on the synchronization pattern,
wherein the DC power source directs power to the two or more of the plurality of DC components in the discontinuous DC format based on the synchronization pattern.

8. The feedback-based load control system of claim 7, wherein each of the plurality of DC components is at least one of a condenser fan, an evaporator blower, a fuel pump, and a drain tube heater.

9. The feedback-based load control system of claim 7, wherein the controller determines whether the current demand for two or more of the plurality of DC components are in the discontinuous DC format by determining for each of the plurality of DC components whether the current demand has a ripple current waveform.

10. The feedback-based load control system of claim 7, wherein the synchronization pattern is a pattern for phasing the current demand such that a peak in the current demand for a first DC component of the two or more of the plurality of DC components in the discontinuous DC format occur at a different time than a peak in the current demand for a second DC component of the two or more of the plurality of DC components in the discontinuous DC format.

11. The feedback-based load control system of claim 7, wherein the DC power source directs power to the two or more of the plurality of DC components in the discontinuous DC format based on the synchronization pattern to phase cancel the current demand from the two or more DC components in the discontinuous DC format.

12. The feedback-based load control system of claim 7, wherein when the controller determines that two DC components of the plurality of DC components are in the discontinuous DC format, the synchronization pattern phases a peak of the current demand of a first DC component in the discontinuous DC format 180° from a peak of the current demand of a second DC component in the discontinuous DC format.

13. The feedback-based load control system of claim 7, wherein when the controller determines that three DC components of the plurality of DC components are in the discontinuous DC format, the synchronization pattern phases a peak of the current demand of a first DC component in the discontinuous DC format 120° from a peak of the current demand of a second DC component in the discontinuous DC format, and phases the peak of the current demand of the second DC component 120° from a peak of the current demand of a third DC component in the discontinuous DC format.

14. The feedback-based load control system of claim 7, further comprising:
  a battery module that supplies power to the plurality of DC components when the DC power source is unavailable; and
  a battery charger that charges the battery module, wherein the DC power source supplies power to the battery charger.

15. A refrigerated transport unit comprising:
  a transport unit; and
  a transport refrigeration system for providing climate control within the transport unit, the transport refrigeration system including a compressor, a condenser, an evaporator, a plurality of DC components for operating the transport refrigeration system, and a feedback-based load control system,
  wherein the feedback-based load control system includes:
    a DC power source supplying power to the plurality of DC components, and
    a controller that:
      monitors a current demand from each of the plurality of DC components,
      determines whether the current demand for the two or more of the plurality of DC components is in a discontinuous DC format, and
      when two or more of the plurality of DC components is in the discontinuous DC format determines a synchronization pattern for supplying power to the two or more of the plurality of DC components, instructs the DC power source to supply power to the two or more of the plurality of DC components based on the synchronization pattern, and
    wherein the DC power source directs power to the two or more of the plurality of DC components in the discontinuous DC format based on the synchronization pattern.

16. The refrigerated transport unit of claim 15, wherein each of the plurality of DC components is at least one of a condenser fan, an evaporator blower, a fuel pump, and a drain tube heater.

17. The refrigerated transport unit of claim 15, wherein the controller determines whether the current demand for two or more of the plurality of DC components are in the discontinuous DC format by determining for each of the plurality of DC components whether the current demand has a ripple current waveform.

18. The refrigerated transport unit of claim 15, wherein the synchronization pattern is a pattern for phasing the current demand such that a peak in the current demand for a first DC component of the two or more of the plurality of DC components in the discontinuous DC format occur at a different time than a peak in the current demand for a second DC component of the two or more of the plurality of DC components in the discontinuous DC format.

19. The refrigerated transport unit of claim 15, wherein the DC power Source directs power to the two or more of the plurality of DC components in the discontinuous DC format based on the synchronization pattern to phase cancel the current demand from the two or more DC components in the discontinuous DC format.

20. The refrigerated transport unit of claim 15, further comprising:
  a battery module that supplies power to the plurality of DC components when the DC power source is unavailable; and
  a battery charger that charges the battery module, wherein the DC power source supplies power to the battery charger.

* * * * *